US006821917B2

(12) United States Patent
Taylor et al.

(10) Patent No.: US 6,821,917 B2
(45) Date of Patent: Nov. 23, 2004

(54) TELLURITE GLASS AND APPLICATIONS THEREOF

(75) Inventors: Elizabeth R Taylor, Eastbourne (GB); Li Na Ng, Southampton (GB); Neil P Sessions, Southampton (GB); Roger C Moore, Cornwall (GB)

(73) Assignee: The University of Southampton, Southampton (GB)

( * ) Notice: Subject to any disclaimer, the term of this patent is extended or adjusted under 35 U.S.C. 154(b) by 182 days.

(21) Appl. No.: 10/172,375

(22) Filed: Jun. 14, 2002

(65) Prior Publication Data

US 2003/0231852 A1 Dec. 18, 2003

(51) Int. Cl.$^7$ ............................. C03C 3/12; C03C 13/04
(52) U.S. Cl. ............................. 501/41; 501/37; 501/38; 385/123; 385/129; 359/341.1; 359/343; 372/40
(58) Field of Search ............................. 501/37, 39, 41; 385/123, 129; 359/341.1, 343; 372/40

(56) References Cited

U.S. PATENT DOCUMENTS

| | | | |
|---|---|---|---|
| 3,855,545 A | | 12/1974 | Cooley |
| 4,652,536 A | * | 3/1987 | Nakajima et al. ............. 501/41 |
| 5,251,062 A | | 10/1993 | Snitzer et al. |
| 6,413,891 B1 | * | 7/2002 | Cho et al. ..................... 501/41 |
| 6,656,859 B2 | * | 12/2003 | Aitken et al. ................. 501/41 |

FOREIGN PATENT DOCUMENTS

EP 0 858 976 A2 8/1998

OTHER PUBLICATIONS

S. Aozasa, et al. "Tm–doped fibre amplifier for 1470 nm band WDM signals." *IEEE Photonics Technology Letters*, 12.10 (2000): 1331–1333.
T. Komukai et al. "Upconversion pumped thulium–doped fluoride fibre amplifier and laser operating at 1.47 $\mu$m, " *IEEE Journal of Quantum Electronics*, 31.11 (1995): 1880–1889.
J.S. Wang et al. "Neodymium–doped tellurite single–mode fiber laser." *Optics Letters*. 19.18 (1994): 1448–1449.
Y.G. Choi et al. "Comparative study of energy transfer from $Er^{3+}$ to $Ce^{3+}$ in tellurite and sulfide glasses under 980 nm excitation." *Journal of Applied Physics*. 88.7 (2000): 3832–3839.

M. Yamada et al. "Gain–flattened tellurite–based EDFA with a flat amplification bandwidth of 76 nm." *IEEE Photonics Technology Letters*. 10.9 (1998): 1244–1246.
S.Q. Man et al. "Tellurite glasses for 1.3 $\mu$m optical amplifiers." *Optics Communications*. 168 (1999): 369–373.
S. Tanabe et al. "Energy transfer and 1.3 $\mu$m emission in Pr–Yb codoped tellurite glass." *Journal of Non–crystalline Solids*, 274 (2000): 55–61.
J.S. Wang et al. "1.3 $\mu$m emission of neodymium and praseodymium in tellurite–based glasses." *Journal of Non–crystalline Solids*. 178 (1994): 109–113.
Y.G. Choi, D.H. Cho, K.H. Kim, "Influence of 4f absorption transitions of $Dy^{3+}$ on the emission spectra of $Tm^{3+}$ –doped tellurite glasses." *Journal of non–crystalline Solids*. 276 (2000): 1–7.
C. Jiang et al. "Yb: tellurite laser glass wtih high emission cross–section." *Materials Letters*. 41 (1999): 209–214.
L. Le Neindre et al. "Effect of the relative alkali content on the absorption linewidth in erbium–doped tellurite glasses." *Journal of Non–crystalline Solids*. 255 (1999): 97–102.
S. Tanabe et al. "Mechanisms and concentration dependences of $Tm^{3+}$ blue and $Er^{3+}$ green up–conversion in codoped glasses by red–laser pumping." *Journal of Luminence*. 65 (1995): 247–255.
R.F Cuevas et al. "Preparation and characterization of tellerium oxide based glass: $Li_2O$–$TiO_2$–$TeO_2$ system." *Journal of Non–Crystalline Solids*. 191 (1995): 107–114.
S. Shen et al., "Thulium–doped tellurite glasses for S–band amplification." *OFC conference '01*. TuQ6–1 (2001).
J.S. Wang et al. "1.47, 1.88 and 2.8$\mu$m emissions of $Tm^{3+}$ and $Tm^{3+}$–$Ho^{3+}$—codoped tellurite glasses." *Journal of Luminescence*. 60&61 (1994): 145–149.
T. Sakomoto. "S–band fiber optic amplifiers." *OFC conference '01*. TuQ1–1 (2001).

* cited by examiner

Primary Examiner—Karl Group
(74) Attorney, Agent, or Firm—Renner, Otto, Boisselle & Sklar, LLP

(57) ABSTRACT

A tellurite glass material has a composition of $Li_2O$:$TiO_2$:$TeO_2$, and contains a dopant comprising ions of a rare earth metal. The rare earth ions can be thulium ions, $Tm^{3+}$, to provide a material offering optical gain at 1470 nm. The properties of the glass make it suitable for the fabrication of high quality optical fibers and planar waveguides, which can in turn be used in optical amplifiers and oscillators. Co-doping the glass with acceptor ions such as holmium ions, $Ho^{3+}$, improves the population inversion in the rare earth ions and hence enhances the gain.

19 Claims, 10 Drawing Sheets

TELLURITE GLASS AND APPLICATIONS THEREOF

BACKGROUND OF THE INVENTION

The present invention relates to tellurite glass which is doped with rare earth ions, and is suitable for the fabrication of optical waveguides.

The demand for telecommunications transmission capacity continues to increase as more data, voice, and video signals are transmitted through the Internet and because of emerging multimedia applications. The demand is addressed by the recent commercial availability of optical fibers (the "AllWave™" fiber) having lower loss than conventional silica fibers in the wavelength region 1280 to 1700 nm. To exploit this advantageous loss characteristic, there is currently a strong interest in the development of optical amplifiers designed to cover a larger or different bandwidth than known amplifiers such as the widely used erbium doped fiber amplifier (EDFA). The EDFA typically operates in the so-called C (conventional) amplifier band, covering 1530 to 1565 nm.

The so-called S (short) band, covering wavelengths in the range 1460 to 1530 nm, can be accessed by the use of thulium ions ($Tm^{3+}$) as a dopant in a glass host material. The energy level structure of $Tm^{3+}$ ions permits radiative emission around 1470 nm. Desirable characteristics in an optical gain medium, for use in optical amplifiers and oscillators, include high gain and high gain flatness over the entire spectral range of interest. To achieve these for the $Tm^{3+}$ ions, it is important to choose a suitable host glass matrix. Also, the glass should be suitable for the manufacture of optical fibers, if fiber amplifiers are to be successfully fabricated.

Silica is widely used as a glass host material for optical fibers and other waveguide structures. However, it is not suitable for the 1470 nm emission from $Tm^{3+}$ ions, because it has too large a phonon energy. The 1470 nm emission originates from the $Tm^{3+}$ $^3H_4$ energy level, which is spaced apart from the lower $^3H_5$ level by an energy gap of ~4400 $cm^{-1}$ when the ions are doped into glasses. To reduce undesirable non-radiative decay from the $^3H_4$ level, the emission of more than five phonons is required to bridge this energy gap. Silica has a phonon energy of ~1100 $cm^{-1}$, so the number of phonons which is equal to the ratio of the ~4400 $cm^{-1}$ energy gap for the 1470 nm transition in $Tm^{3+}$ is only four. Hence the $^3H_4$ level decays predominantly non-radiatively, so that the 1470 nm $Tm^{3+}$ transition is not radiatively efficient in a silica host.

It is therefore necessary to look for a glass host with a lower phonon energy. Fluoride glasses are a possibility. For example, the phonon energy of a zirconium fluoride-based glass is only 550 $cm^{-1}$, and the $Tm^{3+}$ $^3H_4$ transition is 100% radiative. Fiber amplifiers and lasers based on fluoride glass doped with thulium and operating at 1.47 $\mu$m have been demonstrated by Aozasa et al [1] and Komukai et al [2]. However, fluoride glasses are disadvantageous owing to poor glass stability and chemical durability, and their hygroscopic nature. Similar objections apply to phosphate and borate glasses.

Tellurite glasses, which are a large family of glasses containing tellerium oxide, $TeO_2$, have also been used to host rare earth dopants. Many compositions of tellurite glass have been made. For example, U.S. Pat. No. 3,855,545 [3] reports neodymium doping in a tellurite glass of the form $TeO_2:BaO:Li_2O$ which was used to make laser rods. Wang et al [4] used the similar composition $TeO_2:NaO_2:ZnO$ (with and without $Bi_2O_3$) to fabricate a single mode fiber laser. This composition has also been reported in U.S. Pat. No. 5,251,062 [5], which is directed primarily to doping with erbium, but suggests doping with thulium for operation around 2 $\mu$m. Erbium doping in the same composition is also reported by Choi et al [6], who looked at energy transfer between erbium and cerium ions. Further studies of this composition include: erbium doping to produce an EDFA [7]; doping with praseodymium to make 1.3 $\mu$m optical amplifiers [8]; praseodymium-ytterbium co-doping, again directed to 1.3 $\mu$m operation and to study energy transfer between the codopants [9]; doping with neodymium and praseodymium, together with substitution of the sodium for other alkalis [10]; and thulium-dysprosium co-doping, to look at the effect of the dysprosium on the thulium emission spectra [11]. EP 0 858 976 [12] describes a number of tellurite glasses all containing $Bi_2O_3$ and doped with various rare earth metals. Jiang et al [13] have considered tellurite glasses containing $La_2O_3$ which were doped with erbium to achieve a laser material with a high emission cross-section. Neindre et al [14] studied the effects of alkali content on absorption linewidth in erbium-doped tellurites containing oxides of two different alkalis. The use of tellurite glass for frequency conversion has been reported by Tanabe et al [15], who studied the composition $TeO_2:BaO:ZnO$ co-doped with varying levels of thulium and erbium.

As is apparent from the preceding paragraph, the tellurite glasses have been studied in some detail. However, many of the compositions reported have been of limited application owing to the quality of the glass produced. For example, some are restricted to use in bulk oscillator devices because the glass cannot be made into optical fibers. Also, many studies have concentrated in detail on a particular property of a chosen doped tellurite, such as energy transfer between dopant ions, modification of the emission spectra by varying the proportion of components of the glass, or generation of a particular wavelength. Such studies are of little use in determining the presence or absence of the full range of physical and optical characteristics required of a glass if it is to be versatile and well-suited to particular applications.

SUMMARY OF THE INVENTION

Accordingly, a first aspect of the present invention is directed to a tellurite glass material having a composition of $Li_2O:TiO_2:TeO_2$, and containing a dopant comprising ions of a rare earth metal. This composition of tellurite glass, referred to herein as LTT glass, has proved to provide a low phonon energy host material for rare earth ions, so that high quantum efficiencies can be achieved. It has proved capable of receiving high levels of dopant without disproportionate increases in the non-radiative recombination rate, so that high levels of optical gain can be achieved. Similarly, the dopant does not appear to have a detrimental effect on the physical properties of the glass. The titanium has been found to make the glass particularly stable, and importantly, its presence appears not to affect the spectroscopy of the dopant ions. Also, the glass shows no crystallisation or devitrification. The combination of these properties makes it highly suitable for making quality optical fibers, as well as other optical structures such as planar waveguides. In particular, the glass is an attractive candidate for the fabrication of waveguides by the dip spin coating technique. The refractive index of the glass can be selected by varying the amount of lithium; this is thought to arise because the lithium substitutes for the heavier tellerium in the glass matrix. This feature is also of benefit in the fabrication of fibers and waveguides, which require glasses of at least two different refractive indices. The above-mentioned advantageous features combine to render the glass particularly well suited for use in fiber amplifiers, because large amounts of gain can be provided in relatively short lengths of high quality, easily fabricated fiber.

According to various embodiment, the composition of the glass may be such that it comprises 5 to 30 mole % of $Li_2O$ or 15 to 25 mole % of $Li_2O$; 2.5 to 10 mole % of $TiO_2$ or 4 to 6 mole % of $TiO_2$; and 60 to 92.5 mole % of $TeO_2$ or 70 to 80 mole % of $TeO_2$. Varying the amounts of the various components allows properties of the glass, such as refractive index and the stability, to be altered.

Advantageously, the dopant comprises ions of thulium. Thulium ions have an energy level structure such that they emit light at 1470 nm. This is a desirable telecommunications wavelength because it extends the bandwidths commonly used with existing silica-based fiber systems, including erbium-doped fiber amplifiers. The LTT glass has been found to be ideally suited as a host for thulium ions, because the matrix itself appears to have a negligible effect on the energy level structure of the thulium ions. This means that the spectral emission properties of the doped glass are invariant with different molar compositions. Equally importantly, the relatively low phonon energy of the LTT promotes radiative decay in the thulium.

In one embodiment, the tellurite glass further comprises a co-dopant of ions of holmium. The holmium ions act as acceptor ions which can assist in depopulation of the lower transition level in the thulium ions. This improves the population inversion, and hence improves the available optical gain. Alternatively, at least one of ytterbium, terbium or dysprosium may be used as a co-dopant ions, to provide a similar benefit.

In alternative embodiments, the dopant comprises ions of at least one of erbium, ytterbium, neodymium, praseodymium and holmium. These, and other, rare earth metals can be used as desired, alone or in combination, to achieve various effects. For example, different dopants provide gain at different wavelengths. Alternatively, a dopant may used in combination with a dopant providing gain to suppress unwanted amplified spontaneous emission (ASE), such as neodymium used in the cladding region of a waveguide having a thulium-doped core region to suppress ASE at 800 nm.

The concentration of the dopant may be up to about 30000 parts per million, up to about 10000 parts per million, or up to about 5000 parts per million. The LTT glass can receive high concentrations of dopant if required, but lower levels may be preferred in some cases because they have been found to have very little effect on the lifetime of the upper transition level of the dopant ions.

A second aspect of the present invention is directed to an optical waveguide comprising a core region having a first refractive index and a cladding region having a second refractive index lower than the first refractive index, wherein at least the core region is fabricated from a tellurite glass material having a composition of $Li_2O:TiO_2:TeO_2$, and containing a dopant comprising ions of a rare earth metal. The optical waveguide may be fabricated as an optical fiber, or alternatively as a planar waveguide structure.

A third aspect of the present invention is directed to an optical fiber amplifier comprising as its amplification medium an optical fiber comprising a core region having a first refractive index and a cladding region having a second refractive index lower than the first refractive index, wherein at least the core region is fabricated from a tellurite glass material having a composition of $Li_2O:TiO_2:TeO_2$, and containing a dopant comprising ions of a rare earth metal.

A fourth aspect of the present invention is directed to a laser oscillator comprising a gain medium fabricated from a tellurite glass material having a composition of $Li_2O:TiO_2:TeO_2$, and containing a dopant comprising ions of a rare earth metal. The gain medium may be in the form of an optical fiber, to provide a fiber laser, or alternatively the laser oscillator may be configured as a solid-state bulk laser by using the glass per se as the gain medium.

BRIEF DESCRIPTION OF THE DRAWINGS

For a better understanding of the invention and to show how the same may be carried into effect reference is now made by way of example to the accompanying drawings in which.

DETAILED DESCRIPTION

Thulium

Figure 1:
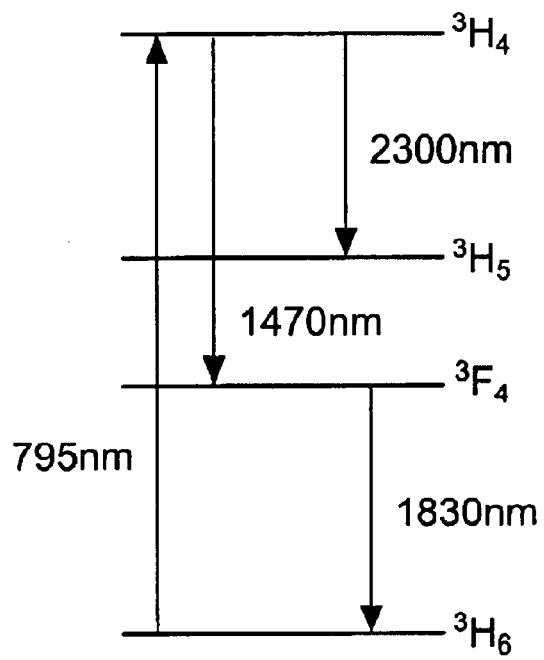
FIG. 1 is diagram showing the energy levels in a thulium ion, $Tm^{3+}$.
Figure 2:
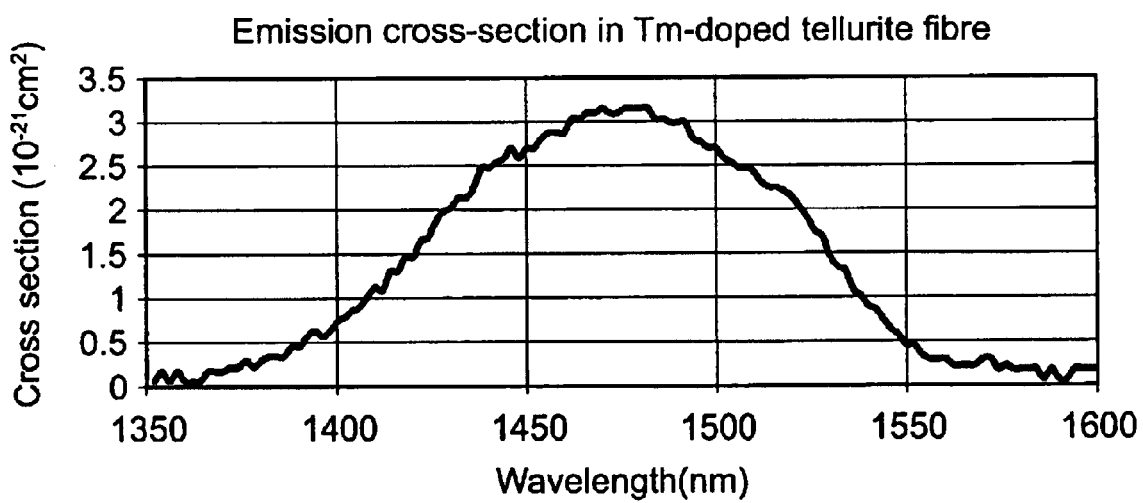
FIG. 2 is a plot of the emission cross-section of the $^3H_4$ to $^3F_4$ transition in thulium ions.

FIG. 1 shows a diagram of the energy levels in $Tm^{3+}$ ions. The $^3H_4$ to $^3F_4$ transition corresponds to an emission around 1470 nm, which falls within the desirable S band amplifier region of 1460 to 1530 nm. FIG. 2 shows a plot of the emission cross-section for this emission. Important considerations for the development of an efficient laser or amplifier operating at 1470 nm include obtaining a high quantum efficiency and a large population inversion between the $^3H_4$ and $^3F_4$ states. The first of these can be addressed by providing a glass host for the ions which has a phonon energy less than about 750 cm$^{-1}$. This value satisfies the condition that more than five photons are required to be emitted to bridge the energy gap of ~4400 cm$^{-1}$ between the upper $^3H_4$ state and the next lowest state, $^3H_5$, so as to significantly reduce non-radiative decay. This condition corresponds to a high quantum efficiency.

Regarding the second consideration, the energy gap between the lower transition state $^3F_4$ and the ground state $^3H_6$ is ~5900 cm$^{-1}$ in glass. This is larger than the gap between the upper transition state $^3H_4$ and the intermediate state $^3H_5$, so that the lifetime of an ion in the $^3F_4$ state is longer than that in the $^3H_4$ state. This makes the relevant $^3H_4$ to $^3F_4$ transition self-terminating, because the population inversion between the $^3H_4$ and $^3F_4$ states is difficult to maintain without depopulation of the lower state. Several depopulation schemes have been proposed, and demonstrated for $Tm^{3+}$ ions in fluoride glass hosts. These include single pump or dual pump upconversion pumping, and co-doping with acceptor ions. In upconversion pumping, $Tm^{3+}$ ions are excited from the $^3F_4$ level to the upper $^3H_4$ level using optical radiation from an infrared source operating at around 1 $\mu$m (for example, 1064 nm from a solid-state $Nd^{3+}$-doped laser). This results in both depopulation of the $^3F_4$ state and population of the $^3H_4$ state, thus improving the population inversion. In co-doping, the $^3F_4$ state is depopulated by co-dopant acceptor ions which acts as a trap and depopulate the $^3F_4$ state through energy transfer. Holmium ions, $Ho^{3+}$, are an example of a suitable co-dopant.

Glass Composition and Preparation

According to the present invention, tellurite glass of the LTT type is doped with ions of a rare earth metal. LTT glasses are composed of oxides of lithium, titanium and tellerium, and have the composition $Li_2O:TiO_2:TeO_2$, where each of these components may be present in varying mole %, and the titanium appears to act as a stabilizer. Further information about LTT glass has been reported by Cuevas et al [16], who studied the glass to investigate its nonlinear optical properties.

Samples having different combinations of mole % together with different concentrations of dopant have been fabricated in accordance with the present invention, and will now be described in detail.

The glasses were prepared as follows: High purity commercial oxides of $TeO_2$, $TiO_2$ and the rare-earth oxides $Tm_2O_3$ and $Li_2CO_3$ (all $\geq$99.999% pure, and obtained from Alfa Aesar and Sigma Aldrich) were used as starting materials. The $Tm_2O_3$ provides the thulium ion dopant, and the $Li_2CO_3$ decomposes to give $Li_2O$. The powders were batched in a dry $N_2$ box. A 60 gram charge weighed to conform to the molar composition was mixed in a PVC container and then transferred to a gold crucible. The crucible was heated to 800° C. for an hour in a resistance furnace. The furnace was previously held overnight at 700° C. with 3 L/min of dry $O_2$. The temperature was then reduced to 600° C. at 5° C./min and held for 20 minutes before casting of the glass in a preheated aluminium mould of 1 cm diameter and 12 cm length. The cast was then annealed down from 270° C. to room temperature at 0.5° C./min. The resulting glasses were clear and had a yellow colour.

Properties of the Glasses

Figure 3:
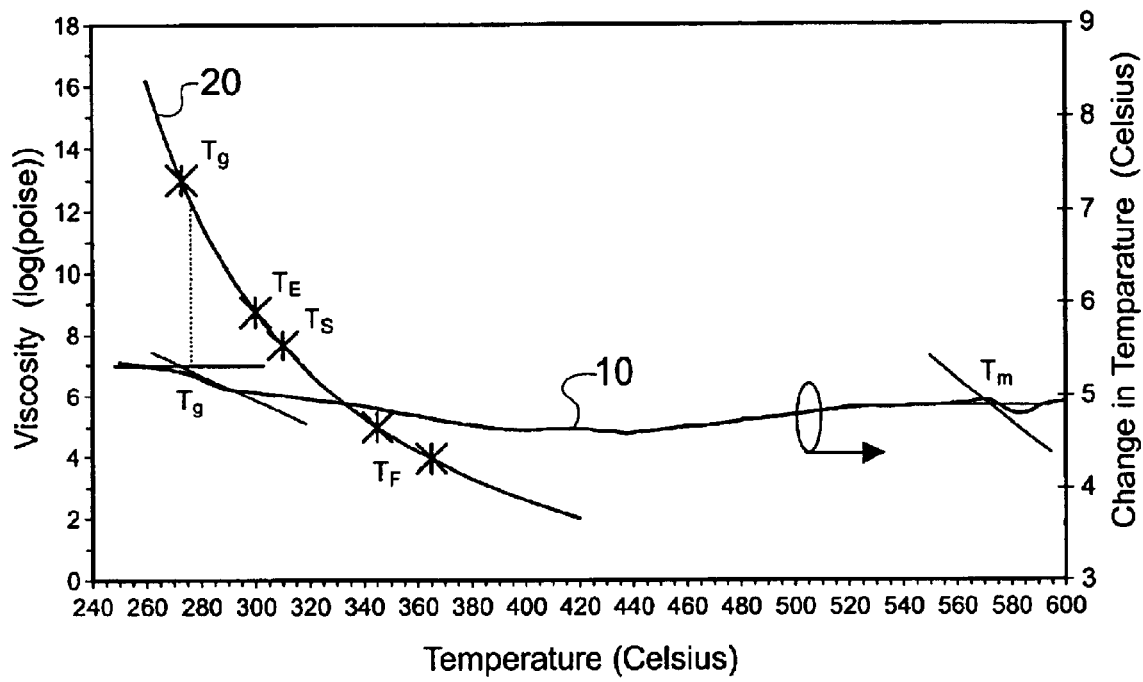
FIG. 3 is a plot of measured viscosity and temperature data from a sample of tellurite glass according to an embodiment of the present invention.

FIG. 3 shows a Differential Thermal Analysis (DTA) trace 10 (change in temperature against temperature, shown on the right-hand axis) measured for a glass sample with the composition $25Li_2O:5TiO_2:70TeO_2$. This indicates that the glass is stable to devitrification. Also, there is no evidence of a sharp crystallization peak. The glass transition temperature $T_g$ of ~270° C. and the melting temperature $T_m$ of ~570° C. are indicated.

Also shown in FIG. 3 is a viscosity curve 20 (variation of viscosity with temperature, shown on the left-hand axis) for the same sample. The characteristic temperatures are indicated: the glass transition temperature $T_g$ is ~273° C., the glass softening temperature $T_s$ is ~345° C., nominal extrusion temperature $T_E$ is ~300° C. and fiber fabrication processing temperature $T_F$ is between ~345° C. and 365° C. The difference between $T_F$ and $T_g$ is <100° C. These properties all indicate that the glass can be drawn into high quality optical fibers, thus making it highly suitable for manufacture of optical amplifiers for use in telecommunications, among other applications.

Figure 4:
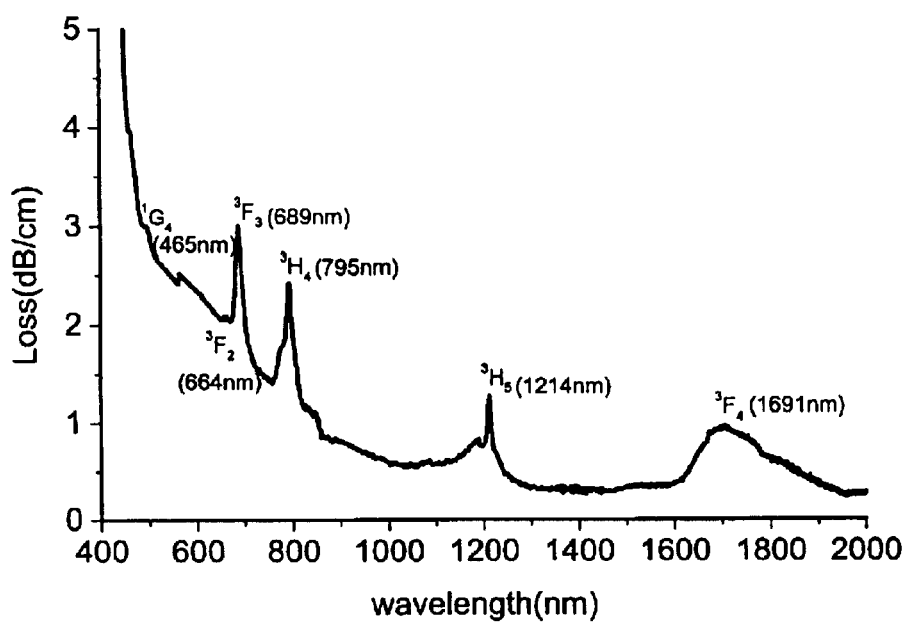
FIG. 4 is a measured absorption spectrum from a sample of tellurite glass according to an embodiment of the present invention.

Moving to the optical properties of the glasses, FIG. 4 shows an absorption spectrum (loss against wavelength) for the sample represented in FIG. 3, measured using an ultraviolet spectrophotometer. This shows a number of absorption peaks, corresponding to the various energy states in the $Tm^{3+}$ ions (see FIG. 1). Of significance is the absorption peak at 795 nm, corresponding to the energy gap between the ground state $^3H_6$ and the upper transition state $^3H_4$ from which the 1470 nm transition originates. 795 nm is a wavelength readily available from established laser sources such as commercially available diodes, and in particular the Ti:sapphire laser, so that pump sources to drive amplifiers and lasers operating at 1470 nm are plentiful.

Figure 5:
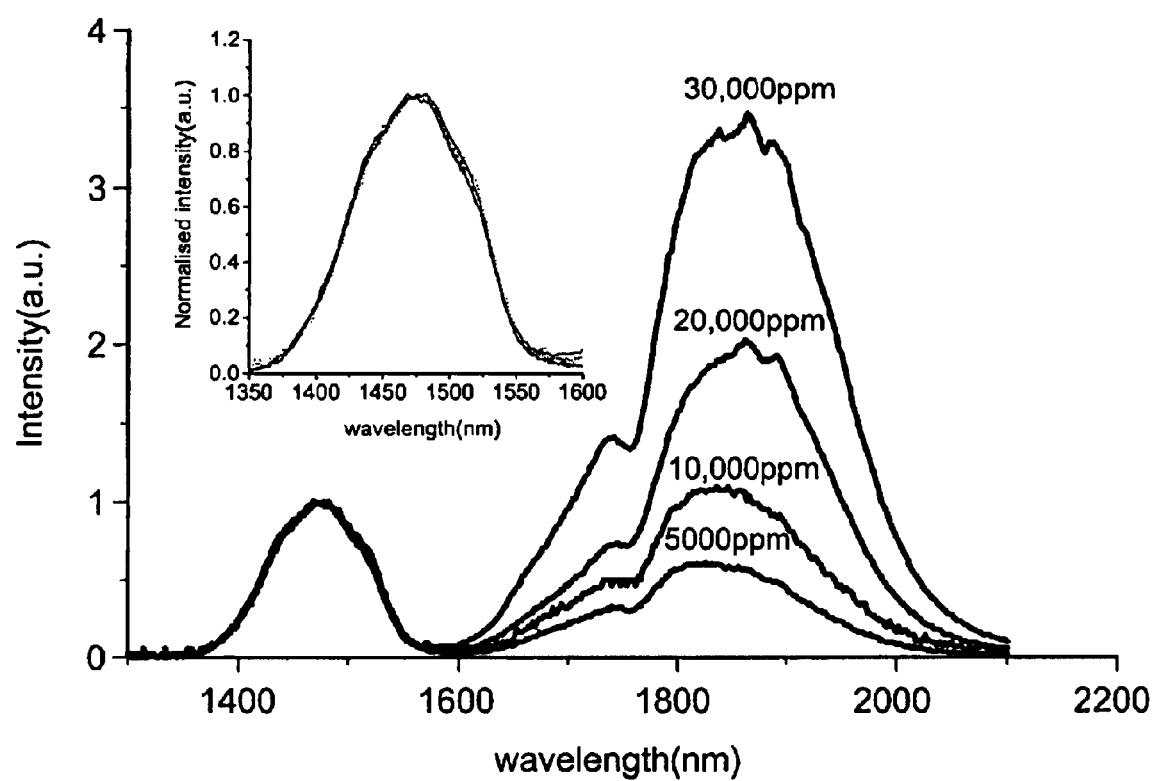
FIG. 5 is a graph showing measured fluorescence spectra from samples of tellurite glass according to various embodiments of the present invention.

Still considering the same LTT composition, FIG. 5 shows how the fluorescence emission of the samples depends on the level of $Tm^{3+}$ doping. A series of fluorescence spectra (as intensity against wavelength) are shown, each obtained by monitoring the fluorescence signal emitted from the samples following pumping at 795 nm with a Ti:sapphire laser. The fluorescence was measured at 90° to the pump light, fed into a monochromator and collected by an InGaAs detector. The results for four samples are shown, having $Tm^{3+}$ concentrations ranging from 5000 ppm to 30000 ppm. There are two main spectral peaks, one at 1470 nm, corresponding to the desired $^3H_4$ to $^3F_4$ transition, and one at 1830 nm, corresponding to the transition from $^3F_4$ back to the ground state of $^3H_6$ (see FIG. 1). Each of the spectra shown in FIG. 5 is normalised to the 1470 nm peak. The inset graph is an enlargement of this peak, which shows good overlap between the various curves. This indicates that the emission at 1470 nm is independent of the level of doping. This is beneficial, because a consistent spectral performance can be expected from amplifiers and lasers made from glass samples having varying doping concentrations. Hence, devices can be fabricated with a doping level appropriate to the amount of gain required, without any undesirable variation in spectral output. Furthermore, the full width at half maximum of the 1470 nm peak is ~100 nm. This is at least 30 nm broader than that reported for $Tm^{3+}$ ions within a fluoride glass host [17]. Hence, a better optical performance can be expected from $Tm^{3+}$ ions in a LTT host when used as a broadband amplifier than from a fluoride host, in addition to the many physical advantages of tellurite glasses over fluoride glasses.

Figure 6:
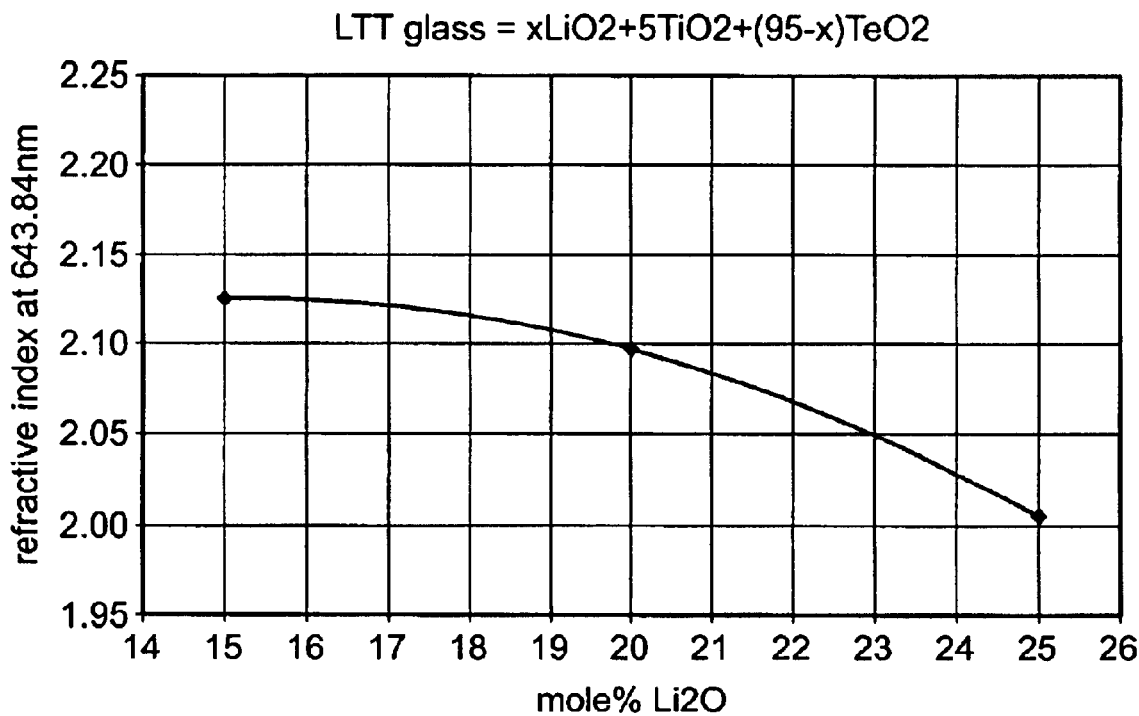
FIG. 6 shows measured refractive index data from samples of tellurite glass according to embodiments of the present invention.

FIG. 6 shows measurements of refractive index and its dependence on the amount of $LiO_2$ present in the glass.

Results for three samples are shown, having the composition $xLi_2O:5TiO_2:(95-x)TeO_2$, with x varying between 15 and 25 mole %. Over this range, the refractive index varies between 2.13 and 2.01, and it is clear that the use of smaller or larger concentrations of $Li_2O$ will increase or decrease the refractive index respectively. This appears to occur because the lithium substitutes for the heavier tellurium in the matrix of the glass. This is a very useful feature, because this control over the refractive index means that appropriate combinations of compositions are available for fabrication of waveguide structures. In a waveguide, such as an optical fiber or a planar waveguide, the guiding structure is defined by a glass with a higher refractive index (the core glass) which is at least partially surrounded by a glass with a lower refractive index (the cladding glass).

Figure 7:
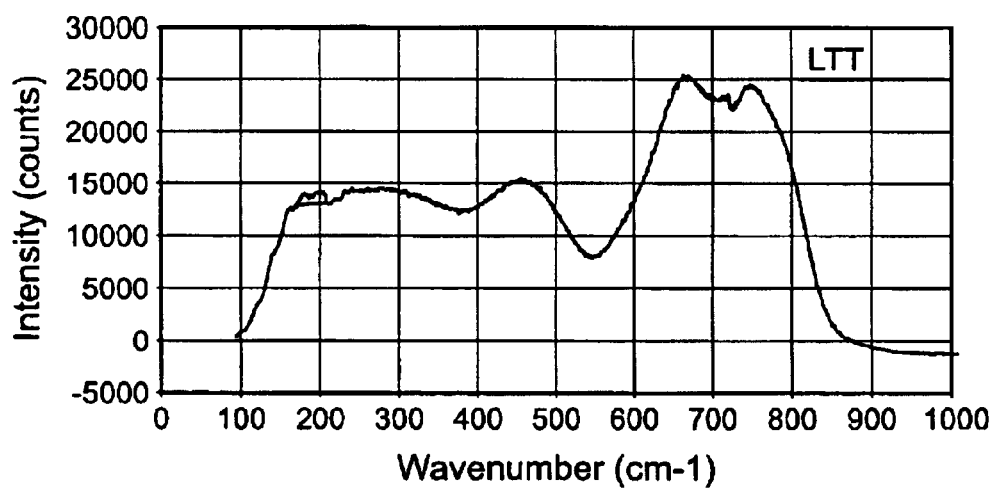
FIG. 7 shows a Raman spectrum obtained from a sample of tellurite glass according to an embodiment of the present invention.

As discussed in the introduction, a relatively low phonon energy is needed to minimise non-radiative decay from excited $Tm^{3+}$ ions, to achieve high quantum efficiency. To determine the phonon energy of the glass samples of the present invention, Raman spectra were measured, in the known manner. FIG. 7 shows the Raman spectrum (intensity against wavenumber) for a sample having the composition $20Li_2O:5TiO_2:75TeO_2$. This indicates that the phonon energy of the glass is similar to that reported for other tellurites. The distinguishing features are the peaks at: 430 $cm^{-1}$ due to Te—O—Te bending modes; 680 $cm^{-1}$ due to the stretching vibrations of $TeO_4$ bipyramids; and 750 $cm^{-1}$ due to stretching vibration of $TeO_3$ trigonal pyramids. The Group I lithium ions in the LTT do not contribute to the phonon energy in the wavenumber range shown. Hence, the phonon energy of the sample is between 680 and 750 $cm^{-1}$. This means that the number of phonons equal to the ratio of the energy gap in the relevant $^3H^4$ to $^3F_4$ $Tm^{3+}$ transition (~4400 $cm^{-1}$) to the phonon energy is ~5.8, and exceeds the threshold for avoiding non-radiative decay. Thus, the 1470 nm transition is expected to be predominantly radiative in the glass, giving a desirable high quantum efficiency.

To consider the quantum efficiency further, the fluorescence lifetime was measured for samples having the composition $25Li_2O:5TiO_2:70TeO_2$, and $Tm^{3+}$ doping levels varying from 2,500 ppm to 20000 ppm. The measurements were made by chopping incoming pump light at 795 nm and inserting appropriate filters in front of an InGaAs detector, so that fluorescence decay from the $^3H_4$ state (1470 nm) and the $^3F_4$ state (1830 nm) could be recorded on an oscilloscope. The response of the system was 20 $\mu m$.

Figure 8:
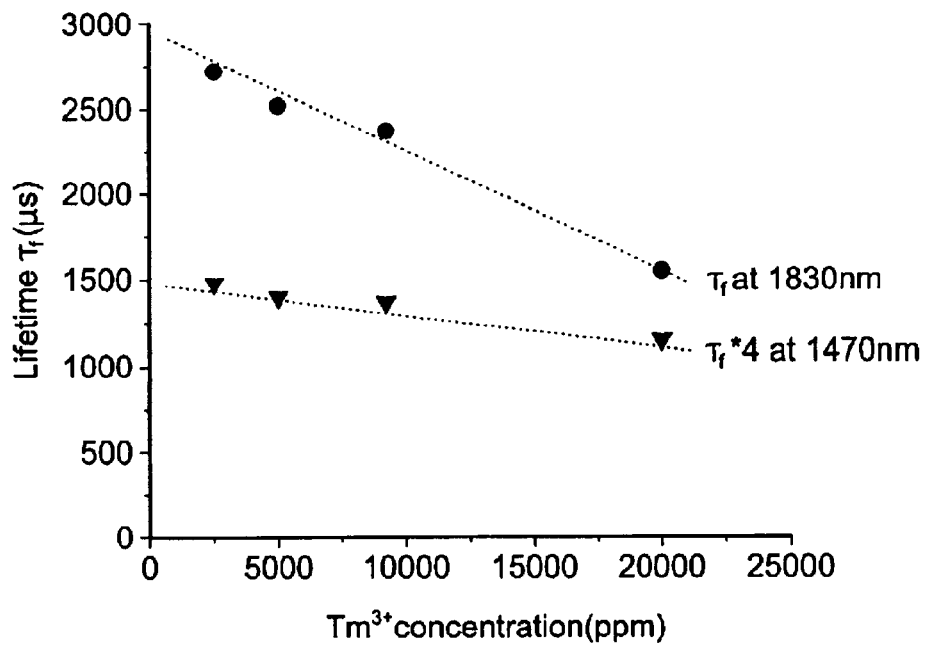
FIGS. 8 and 9 show measured fluorescence lifetime data from samples of tellurite glass according to embodiments of the present invention.

The variation of lifetime with doping concentration for both the transitions is shown in FIG. 8 (note that the results for the 1470 nm signal are shown ×4). From this, it can be seen that the lifetimes of both the $^3H_4$ and $^3F_4$ states decrease with increasing $Tm^{3+}$ concentration. The effect is more dramatic in the latter case, owing to OH-added concentration quenching (arising from the presence of water in the samples), which does not affect the important 1470 nm transition. The OH fundamental frequency is at 3300 nm, so the first overtone is expected at 1650 nm.

Also, the measured lifetime of the 1470 nm fluorescence for 2,500 ppm of $Tm^{3+}$ is 370 $\mu s$. Using the Judd-Ofelt model, the radiative lifetime is calculated to be 380 $\mu s$. These figures give an excellent quantum efficiency of ~97%.

Furthermore, the lifetime of the $^3F_4$ state is approximately seven times longer than that of the $^3H_4$ state, owing to a larger energy gap of 5860 $cm^{-1}$ between the $^3F_4$ state and the $^3H_6$ ground state. This makes the desired $^3H_4$ to $^3F_4$ transition self-terminating, because it is not possible to maintain a sufficiently large population inversion by using only a simple pumping arrangement to excite the $^3H_4$ state from the $^3H_6$ ground state. To improve the population inversion, it is possible to use alternative pumping schemes to depopulate the $^3F_4$ state. Examples include upconversion using a single or a dual pump scheme. For example, a dual pump scheme using 795 nm light from a Ti:sapphire laser and 1064 nm light from a Nd:YAG laser can be used. Without the 1064 nm light, the long-lived $^3F_4$ state is not depopulated, but in the presence of 1064 nm light, some depopulation is achieved.

An alternative approach to enhancing the population inversion is to modify the glass itself, by co-doping it with a so-called acceptor ion. This has the effect of reducing the lifetime of the lower state. A suitable ion to use with $Tm^{3+}$ is holmium ($Ho^{3+}$)[18], because it has no absorption at the pump wavelength of 795 nm or at the emission/signal wavelength of 1470 nm. To this end, a sample of $Tm^{3+}/Ho^{3+}$ co-doped LTT glass was made, with a $Tm^{3+}$ concentration of 2000 ppm. Measurements showed that the lifetime of the $^3F_4$ state was reduced by 33% compared to samples with no co-doping. Importantly, the lifetime of the $^3H_4$ upper state was not affected by the co-doping. It is estimated that a $Ho^{3+}$ concentration of 10000 ppm is appropriate to achieve an appreciable effect, although greater or lesser concentrations may be used to good effect. Other known suitable acceptor co-dopants include ytterbium, terbium and dysprosium alone or in combination with each other or with holmium.

Figure 9:
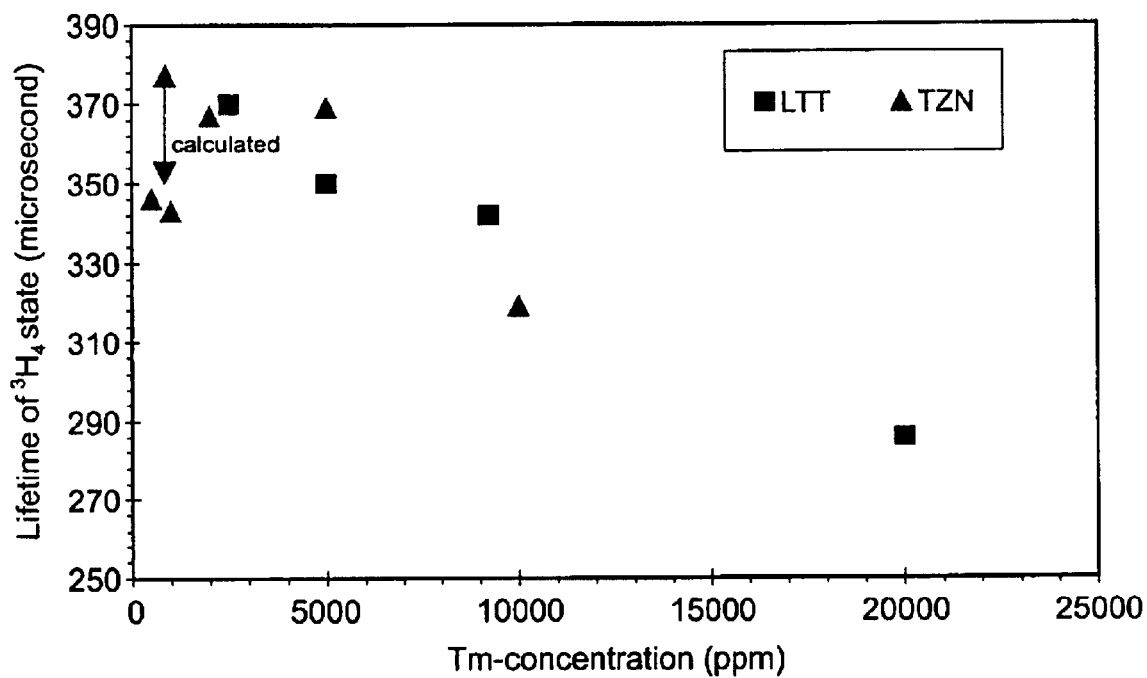

FIG. 9 shows further measurements of the variation of the fluorescence lifetime of the $^3H_4$ state with $Tm^{3+}$ doping concentration. The results for an LTT sample having the composition $25Li_2O:5TiO_2:75TeO_2$ are shown (square data points), and compared with values obtained for an alternative tellurite glass $75TeO_2:20ZnO:5Na_2O$ (TZN) (triangular data points). For the LTT samples, the $^3H_4$ radiative lifetime calculated using the Judd-Ofelt calculation is 365±15 $\mu s$, represented by the arrow in FIG. 9. The measured lifetime agrees well with this calculation for $Tm^{3+}$ concentrations of up to about 5000 ppm. Concentration quenching appears to start at concentrations greater than 5000 ppm. This suggests that using smaller doping concentrations, of 5000 ppm or less, is to be preferred, although reasonable performance can still be expected for higher doping levels, up to about 10000 ppm, and even up to 30000 ppm or above. Indeed, the various results presented herein show that the LTT glasses are capable of accepting very large dopant concentrations (of both the rare earth ions and any acceptor co-dopant) without detriment to the physical properties of the glass. Hence, quality waveguide devices providing high levels of gain can readily be fabricated from the glasses of the present invention. Additionally, crystal growth rate studies were conducted and showed that the LTT is a more stable glass than the TZN. Of the two compositions shown in FIG. 9, the LTT had a growth rate of only 3 $\mu m/min$, compared with a much larger rate of 900 $\mu m/min$ for the TZN.

Waveguide Devices

As mentioned, the doped glasses described herein are well-suited for waveguide fabrication, as the refractive index can be selected by using an appropriate amount of lithium. In addition, the physical properties of the glass, including its various temperatures and lack of crystallization, mean that it can be successfully drawn into optical fibers.

Figure 10:
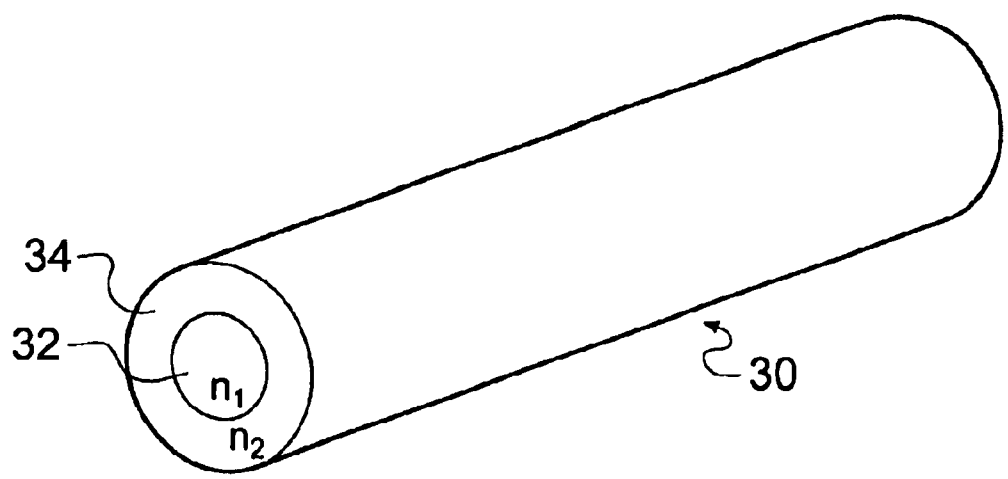
FIG. 10 is a perspective view of an optical fiber fabricated from tellurite glass according to embodiments of the present invention.

FIG. 10 shows an example of a typical optical fiber 30, comprising a core 32 of glass having a refractive index n1 surrounded by a cladding of glass having a lower refractive index n2. Internal reflection at the boundary between the core 32 and the cladding 34 acts to guide light along the fiber 30 by confining it to the core 32. Optical fibers may have more complicated structures than that illustrated.

Figure 11:
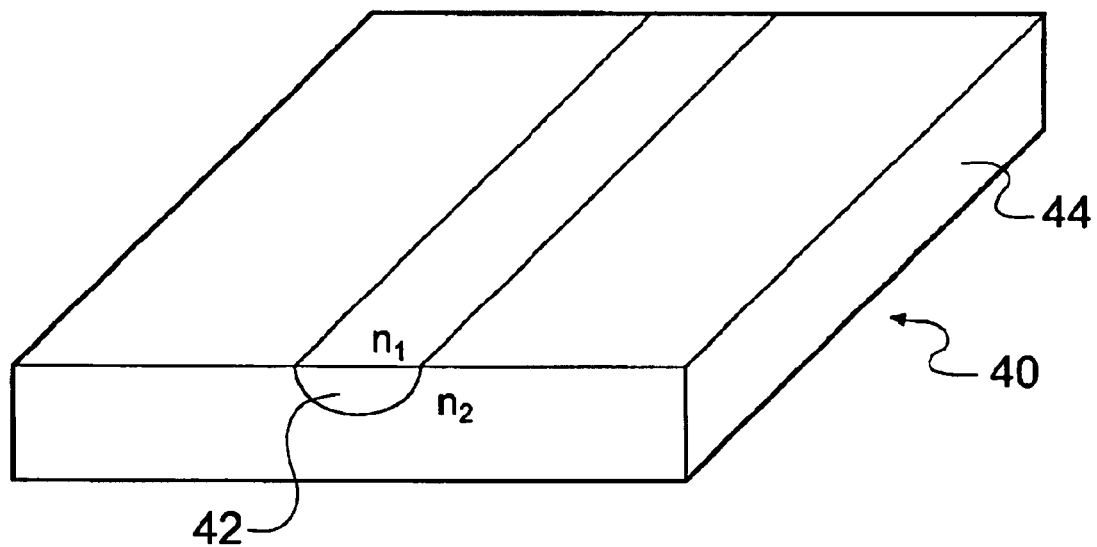
FIG. 11 is a perspective view of a planar waveguide fabricated from tellurite glass according to embodiments of the present invention.

FIG. 11 shows an alternative waveguide structure, in the form of a planar waveguide 40. In this case, the "cladding" region 44 is formed as a substantially planar structure, and the "core" region 42 is formed as a channel of higher refractive index material at the surface of the cladding region 44. As with the optical fiber, light is guided along the core region 42 by internal reflection.

The doped LTT glass has been used to fabricate optical fibers having numerical apertures of 0.2 and 0.4, where the numerical aperture NA is defined as $NA=(n1^2-n2^2)^{1/2}$.

Using the measured refractive index data discussed with reference to FIG. 6, suitable core and cladding glasses were selected to fabricate a fiber having a NA of 0.2. The core glass composition was $20Li_2O:5TiO_2:75TeO_2$ with a $Tm^{3+}$ doping concentration of 4000 ppm, and the cladding glass composition was $21Li_2O:5TiO_2:74TeO_2$. The fiber preform, from which the fiber is drawn, was produced by built-in casting. Any other suitable technique can also be used, such as rod-in-tube, rotational casting, extrusion, or a combination of these. The preform was then drawn, in the usual way, to make a single mode fiber of outer diameter 125 $\mu$m and core diameter of 5 $\mu$m.

Figure 12:
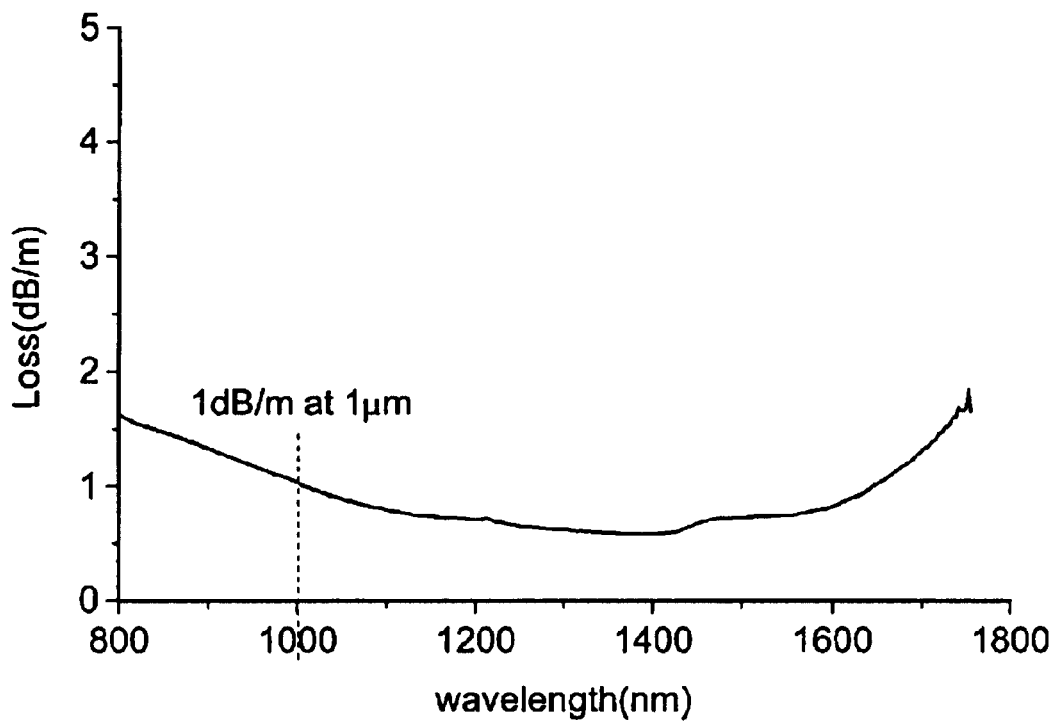
FIGS. 12 and 13 show loss measurements obtained from tellurite glass according to embodiments of the present invention and used to make an optical fiber.
Figure 13:
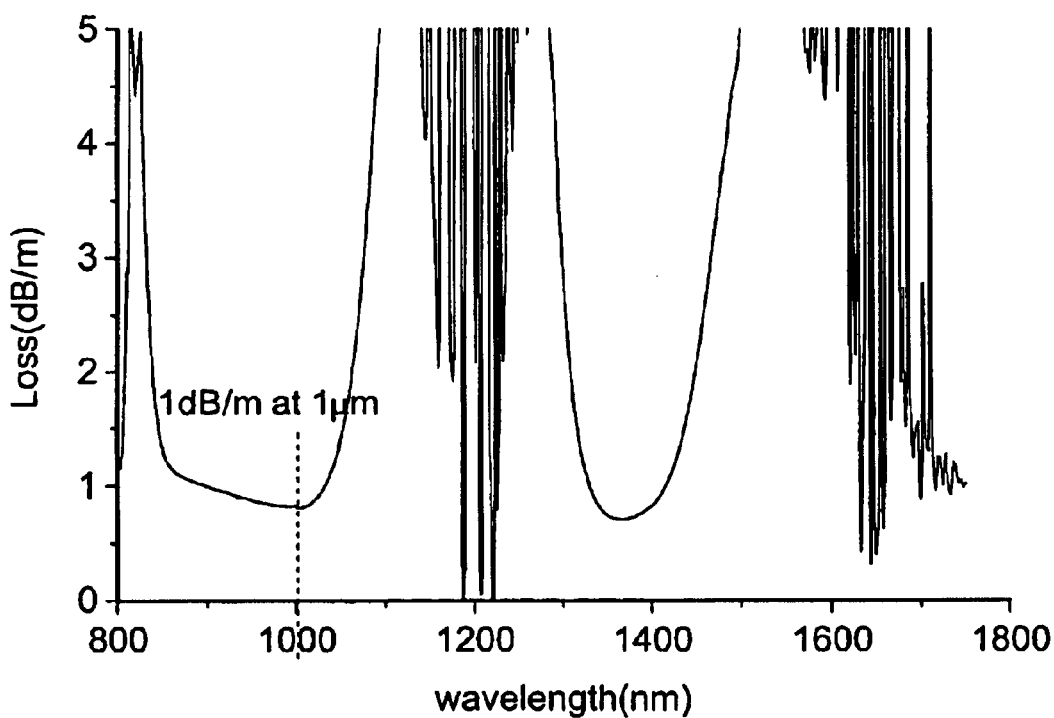

FIGS. 12 and 13 show the measured attenuation as a function of wavelength of, respectively, the core and cladding glasses used. As can be seen, a background loss of 1 dB/km at a wavelength of 1 $\mu$m was measured for both glasses, indicating that the resulting fiber could be expected to be relatively low loss.

Gain measurements were performed on the fiber in the known manner. Two pumping schemes were used, a single pump scheme using 795 nm light from a Ti: sapphire laser, and a dual pump scheme using the 795 nm light and 1064 nm light from a Nd:YAG laser. The signal source was tunable from 1460 nm to 1560 nm, and the input signal power was maintained at −20 dBm incident on the fiber.

Figure 14:
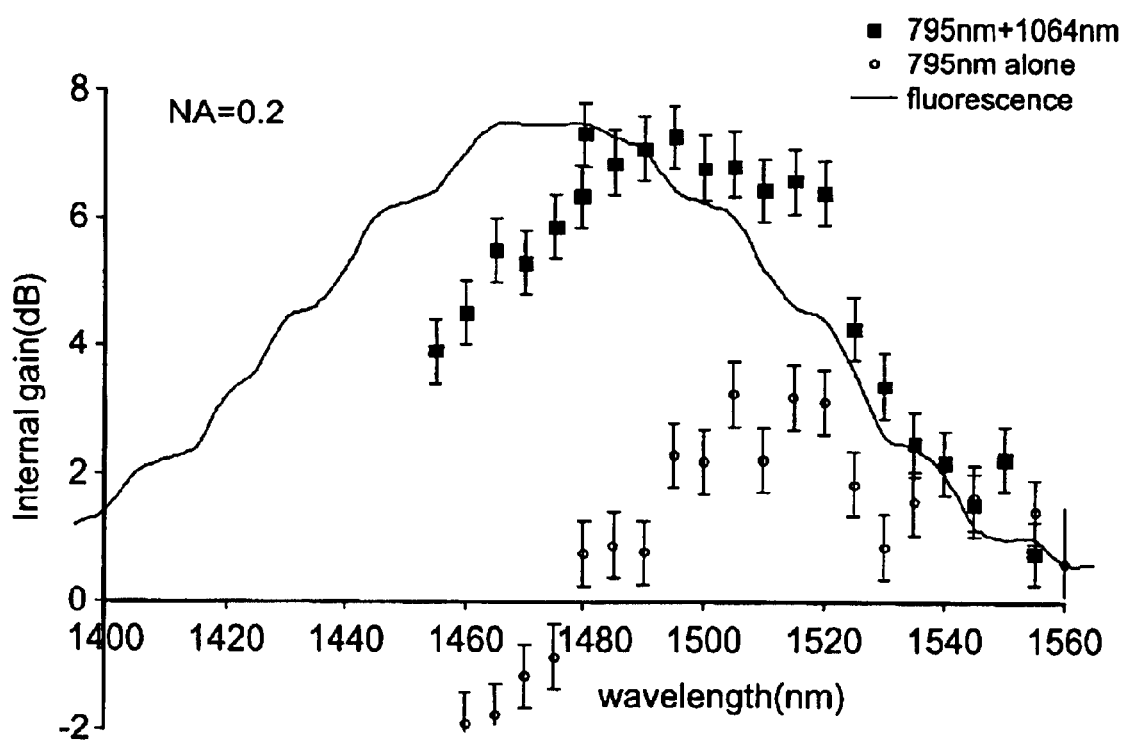
FIGS. 14, 15 and 16 show gain measurements obtained from optical fibers fabricated from tellurite glass according to embodiments of the present invention.

The measured gain spectra (internal gain versus wavelength) are shown in FIG. 14, together with a measured fluorescence spectra for comparison. The single pump scheme results are indicated by circular data points and the dual pump scheme results by the square data points. As can be seen, the gain was greatly enhanced by use of the dual pumping scheme, owing to the improved population inversion. A gain of 7 dB at a wavelength of 1480 nm was achieved with the dual pump scheme. Fabrication of a similar fiber having a higher numerical aperture of 0.4 is expected to have a gain of 30 dB.

A multimode fiber was also fabricated. The LTT glass was doped with a $Tm^{3+}$concentration of 4000 ppm, and had a composition of $24Li_2O:5TiO_2:71TeO_2$ and $26Li_2O:5TiO_2:69TeO_2$ for the core and cladding respectively. The fiber had a NA of 0.4 and a core diameter of 40 $\mu$m. The background loss was measured to be 3 dB/m at 1 $\mu$m.

Figure 15:
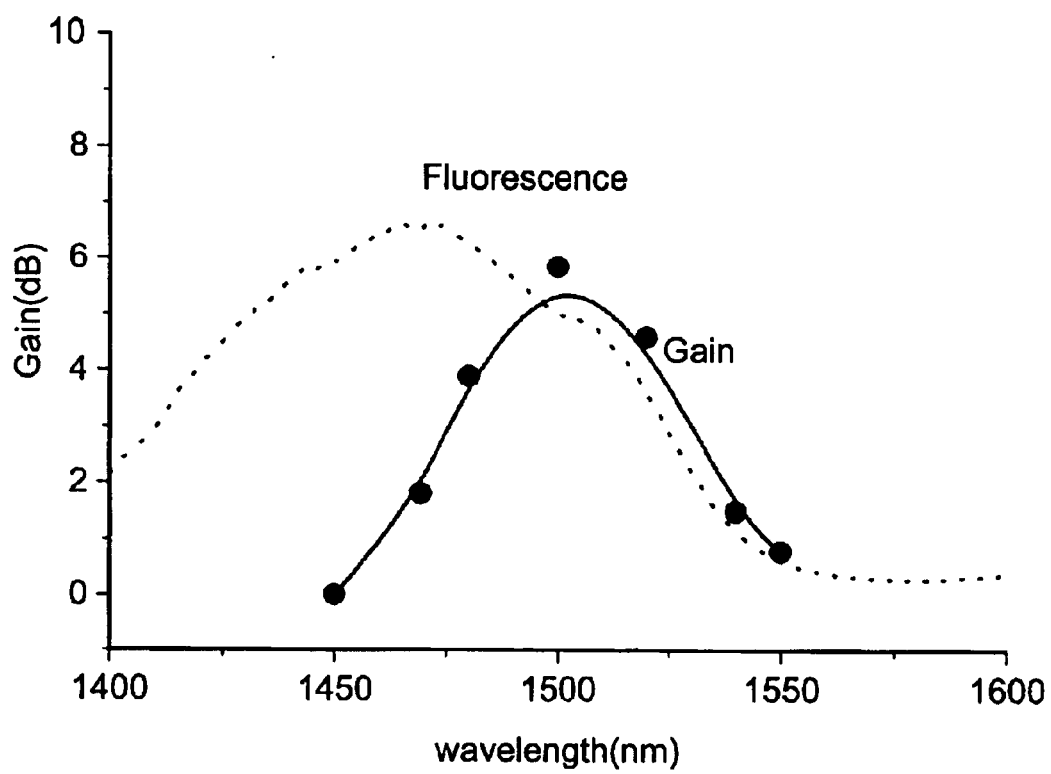

FIG. 15 shows the results of gain measurements performed on this fiber, using a Ti:sapphire laser at 795 nm as a pump source and a laser diode tunable between 1470 nm and 1550 nm as the signal source. The pump power was ~600 mW (uncorrected for coupling losses) and the signal power was maintained at ~70 dBm. The gain spectrum shown in FIG. 15 (solid line) was obtained using three-point averaging. A measured fluorescence spectrum (dotted line) is superimposed for comparative purposes. The fiber shows a gain extending to longer wavelengths (1550 nm) than gain reported from a $Tm^{3+}$-doped fluoride fiber [19]. The measured gain profile reflects the influence of signal ESA, because in this case the $^3F_4$ state in the $Tm^{3+}$ ions is not depopulated by either dual pumping or a co-dopant such as $Ho^{3+}$.

Figure 16:
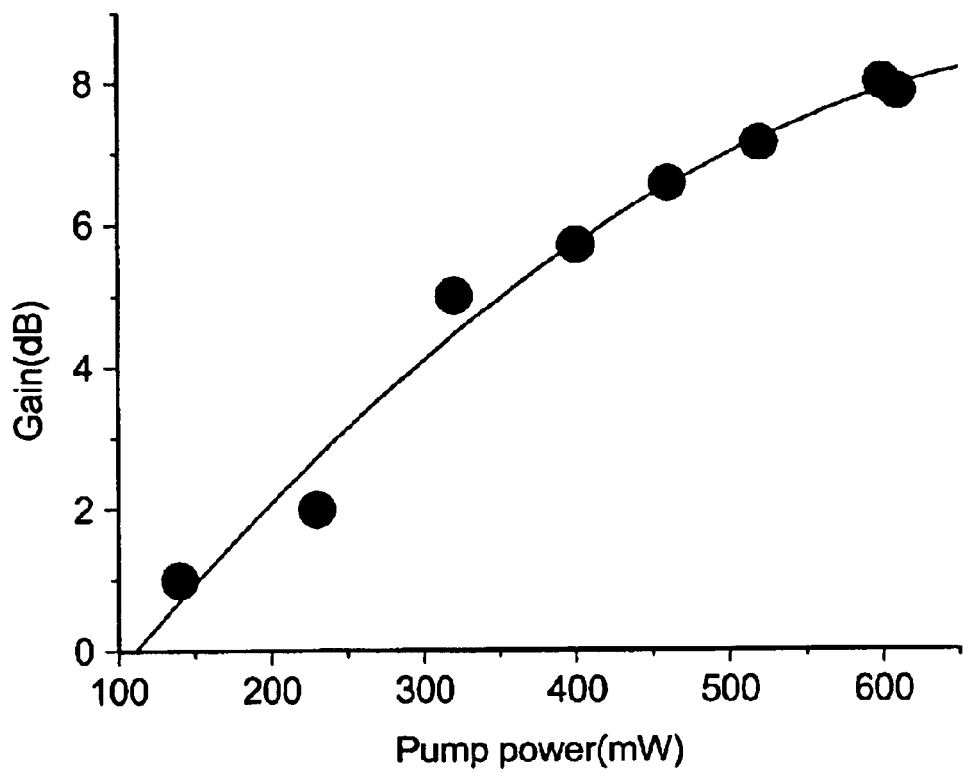

FIG. 16 shows the results of measurements of the increase of gain with pump power for this fiber.

Alternative designs of optical fiber may be fabricated from the $Tm^{3+}$-doped LTT, with NA apertures and dimensions as desired. The cladding may or may contain active ions of thulium; the optical gain the ions provide is generally only required in the core region. Also, the cladding glass may be doped with other rare earth ions such as neodymium, which act to suppress undesirable amplified spontaneous emission. Alternatively, the $Tm^{3+}$-doped LTT glass may be used for the core only, with a different type of glass, which need not be LTT glass, or even a tellurite glass, as the cladding. These points apply equally to the fabrication of planar waveguides from the $Tm^{3+}$-doped LTT glass.

Applications

As described with reference to FIGS. 10 and 11, the doped tellurite glasses described herein are suitable for the fabrication of waveguide structures in the form of both optical fibers and planar waveguides. These may be used in optical amplifiers and oscillators. Also, the bulk material may be used directly as an optical gain medium, in a laser oscillator.

Figure 17:
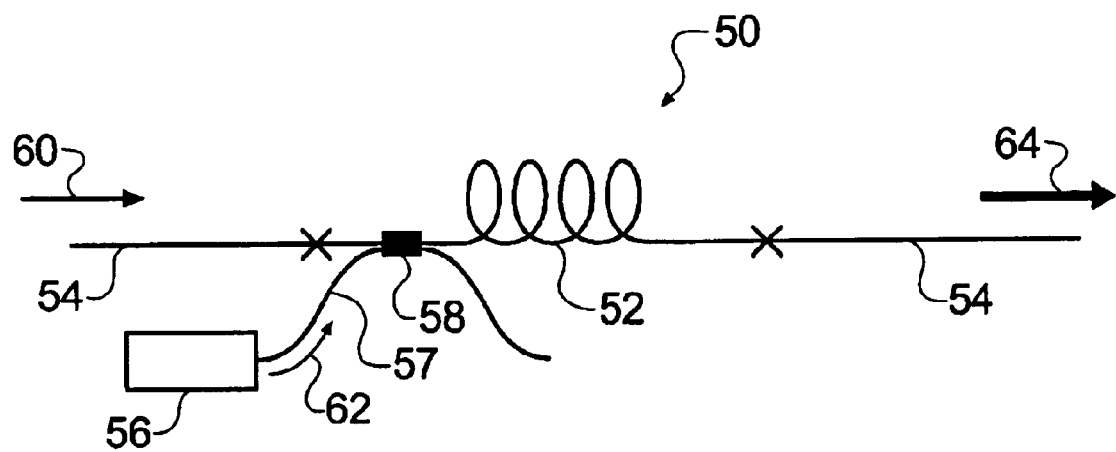
FIG. 17 is a schematic diagram of a fiber amplifier comprising optical fiber fabricated from tellurite glass according to an embodiment of the present invention.

The optical fiber may be used to construct optical fiber amplifiers for amplification of signal wavelengths around 1470 nm, which falls in the amplifier S band. Optical sources operating around 795 nm, such as Ti:sapphire lasers, are suitable for use as pump sources. FIG. 17 is a schematic diagram of such a fiber amplifier using fiber made from the $Tm^{3+}$-doped LTT glass of an embodiment the present invention. The amplifier 50 comprises a length of LTT glass fiber 52, which acts as the amplification medium of the amplifier, spliced between two lengths of fiber 54 suitable for propagation of the signal wavelength. A pump source 56 produces pump radiation 62 which is coupled into a fiber 57. This fiber 57 is coupled to the LTT glass fiber 52 by a suitable fiber coupling device 58, such as a 3 dB coupler. Signal radiation 60 propagating along the fiber 54 enters the LTT glass fiber 52 and is amplified in the known manner by gain created in the LTT glass fiber 52 by the pump radiation 62. The amplified signal radiation 64 exits the amplifier by way of the fiber 54.

Figure 18:
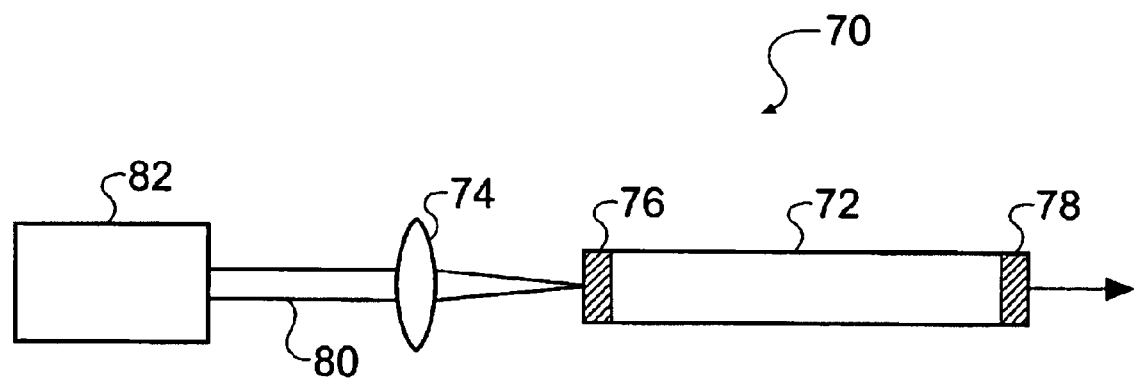
FIG. 18 is a schematic diagram of a fiber laser comprising optical fiber fabricated from tellurite glass according to an embodiment of the present invention.

Similarly, $Tm^{3+}$-doped LTT glass optical fiber can be configured as a fiber laser. FIG. 18 is a schematic diagram of such a laser 70, which comprises a length of LTT fiber 72 provided with reflectors 76 and 78 at its ends. These are configured to provide optical feedback at the laser wavelength of 1470 nm. Pump radiation 80 at 795 nm generated from a pump source 82 is focussed into the fiber by a lens 74. The laser output 84, generated in the fiber in the known manner, leaves the fiber 72 through the reflector 78, which is only partially reflecting at the laser wavelength.

Other Embodiments

The preceding description has concentrated on $Tm^{3+}$ ions as the active ion in the LTT glass. However, the glass also serves as a suitable host matrix for ions of other rare earth metals. Consequently, glasses in accordance with embodiments of the invention may be fabricated which are doped with one or more of any other rare earth metal, including erbium, ytterbium, neodymium, holmium and praseodymium. These metals can be used as dopants alone or in combination (including with thulium) to obtain gain at various wavelengths, as is well-known, and/or to achieve other effects such as suppression of unwanted amplified spontaneous emission, improvement of population inversion, modification of refractive index, or reduction of the risk of clustering in the glass structure.

Also, the mole % quantities of the $Li_2O$, $TiO_2$ and $TeO_2$ in the LTT can be widely varied and hence may differ from those in the embodiments discussed thus far. As stated, the amount of $Li_2O$ present affects the refractive index of the glass. It may usefully be varied at least within the range 5 to 30 mole %, particularly within the range 15 to 25 mole %. The presence of $TiO_2$ helps to stabilize the structure of the glass. Good results have been obtained with a level of $TiO_2$ of about 5 mole %, but amounts at least in the ranges 4 to 6 mole %, or 2.5 to 10 mole %, can be used. Concerning the amount of $TeO_2$, larger quantities can be tolerated, but it should preferably be provided within the range of 60 to 92.5 mole %, and more preferably within the range 70 to 80 mole %.

It will be appreciated that although particular embodiments of the invention have been described, many modifications/additions and/or substitutions may be made within the spirit and scope of the present invention.

References

[1] S. Aozasa, T. Sakamoto, T. Kanamori et al., "Tm-doped fibre amplifier for 1470 nm band WDM signals," IEEE Photonics Tech. Lett. 12 (2000) 1331–1333

[2] T. Komukai, T. Yamamoto, T. Sugawa, Y. Miyajima, "Upconversion pumped thulium-doped fluoride fibre amplifier and laser operating at 1.47 $\mu$m," IEEE Journal of Quantum Electro. 31 (1995) 1880–1889

[3] U.S. Pat. No. 3,855,545

[4] J. S. Wang, D. P. Machewirth, F. Wu, E. Snitzer, E. M. Vogel, "Neodymium-doped tellurite single-mode fiber laser", Optics Letters 19 (1994) 1448–1449

[5] U.S. Pat. No. 5,251,062

[6] Y. G. Choi, K. H. Kim, "Comparative study of energy transfer from $Er^{3+}$ to $Ce^{3+}$ in tellurite and sulfide glasses under 980 nm excitation", Journal of Applied Physics, 88 (2000) 3832–3839

[7] M. Yamada, A. Mori et al., "Gain-flattened tellurite-based EDFA with a flat amplification bandwidth of 76 nm", IEE Photonics Technology Letters, 10 (1998) 1244–1246

[8] S. Q. Man, E. Y. Pun, P. S. Chung, "Tellurite glasses for 1.3 $\mu$m optical amplifiers", Optics Communications 168 (1999) 369–373

[9] S. Tanabe, T. Kouda, T. Hanada, "Energy transfer and 1.3 $\mu$m emission in Pr-Yb codoped tellurite glass", Journal of Non-crystalline Solids 274 (2000) 55–61

[10] J. S. Wang, E. M. Vogel et al., "1.3 $\mu$m emission of neodymium and praseodymium in tellurite-based glasses", Journal of Non-crystalline Solids 178 (1994) 109–113

[11] Y. G. Choi, D. H. Cho, K. H. Kim, "Influence of 4f absorption transitions of $Dys^{3+}$ on the emission spectra of $Tm^{3+}$-doped tellurite glasses", Journal of non-crystalline Solids 276 (2000) 1–7

[12] EP 0 858 976

[13] C. Jiang, F. Gan et al., "Yb: tellurite laser glass with high emission cross-section", Materials Letters 41 (1999) 209–214

[14] L. Le Neindre, S. Jiang et al., "Effect of the relative alkali content on the absorption linewidth in erbium-doped tellurite glasses", Journal of Non-crystalline Solids, 255 (1999) 97–102

[15] S. Tanabe, K. Suzuki, N. Soga, T. Hanada, "Mechanisms and concentration dependences of $Tm^{3+}$ blue and $Er^{3+}$ green up-conversion in codoped glasses by red-laser pumping", Journal of Luminence, 65(1995) 247–255

[16] R. F Cuevas, L. C. Barbosa, A. M. de Paula, Y. Liu, V. C. S. Reynoso, O. L. Alves, N. Aranha, C. L. Cesar, "Preparation and characterization of tellerium oxide based glass: $Li_2O$—$TiO_2$—$TeO_2$ system", Journal of Non-Crystalline Solids 191 (1995) 107–114

[17] S. Shen et al., OFC conference '01, TuQ6-1, 2001

[18] J. S. Wang, E. Sitzer, E. M. Vogel, G. H. Sigel, "Tm—Ho co-doped tellurite glasses," Journal of Luminescence, 60&61 (1994) 145–149

[19] T. Sakomoto et al., OFC conference '01, TuQ1-1, 2001

What is claimed is:

1. A tellurite glass material having a composition of $Li_2O:TiO_2:TeO_2$, and containing a dopant comprising ions of a rare earth metal.

2. The tellurite glass material of claim 1, comprising 5 to 30 mole % of $Li_2O$.

3. The tellurite glass material of claim 1, comprising 15 to 25 mole % of $Li_2O$.

4. The tellurite glass material of claim 1, comprising 2.5 to 10 mole % of $TiO_2$.

5. The tellurite glass material of claim 1, comprising 4 to 6 mole % of $TiO_2$.

6. The tellurite glass material of claim 1, comprising 60 to 92.5 mole % of $TeO_2$.

7. The tellurite glass material of claim 1, comprising 70 to 80 mole % of $TeO_2$.

8. The tellurite glass of claim 1, wherein the dopant comprises ions of thulium.

9. The tellurite glass of claim 8, further comprising a co-dopant of ions of holmium.

10. The tellurite glass material of claim 8, further comprising a co-dopant of ions of at least one of ytterbium, terbium and dysprosium.

11. The tellurite glass of claim 1, wherein the dopant comprises ions of at least one of erbium, ytterbium, neodymium, praseodymium and holmium.

12. The tellurite glass of claim 1, wherein the concentration of the dopant is up to 30000 parts per million.

13. The tellurite glass of claim 1, wherein the concentration of the dopant is up to 10000 parts per million.

14. The tellurite glass of claim 1, wherein the concentration of the dopant is up to 5000 parts per million.

15. An optical waveguide comprising a core region having a first refractive index and a cladding region at least partially surrounding the core region and having a second refractive index lower than the first refractive index, wherein at least the core region is fabricated from tellurite glass material having a composition of $Li_2O:TiO_2:TeO_2$, and containing a dopant comprising ions of a rare earth metal.

16. The optical waveguide of claim 15, wherein the optical waveguide is fabricated as an optical fiber.

17. The optical waveguide of claim 15, wherein the optical waveguide is fabricated as a planar waveguide structure.

18. An optical fiber amplifier comprising as its amplification medium an optical fiber comprising a core region having a first refractive index and a cladding region at surrounding the core region and having a second refractive index lower than the first refractive index, wherein at least the core region is fabricated from tellurite glass material having a composition of $Li_2O:TiO_2:TeO_2$, and containing a dopant comprising ions of a rare earth metal.

19. A laser oscillator comprising a gain medium fabricated from a tellurite glass material having a composition of $Li_2O:TiO_2:TeO_2$, and containing a dopant comprising ions of a rare earth metal.

* * * * *